United States Patent Office 3,160,887
Patented Dec. 8, 1964

3,160,887
BROADSIDE ARRAY WITH ADJUSTABLE COUPLING NETWORK FOR BEAM SHAPING
Georges Broussaud and Erich Spitz, Paris, France, assignors to Compagnie Generale de Telegraphie Sans Fil, a corporation of France
Filed Mar. 30, 1960, Ser. No. 18,598
Claims priority, application France, Apr. 10, 1959, 791,715
7 Claims. (Cl. 343—777)

The present invention relates to directional aerials of the broadside type. The radiation pattern of such aerials is a direct function of the dimensions thereof. It is well known that in broadside aerials, $\theta$ being the aperture of the radiation pattern in a given plane, $\lambda$ the operating wave-length and D the aperture of the aerial, the maximum possible directivity is defined by the following equation:

$$\sin \theta = 0.8 \lambda / D \qquad (1)$$

Thus, for a given wavelength, sin $\theta$ is inversely proportional to D. Under certain conditions, it may be desirable to obtain a given radiation pattern with an aerial having an aperture which is as small as possible and, in particular, smaller than that resulting from the above formula. It is an object of the present invention to provide such an aerial.

An aerial according to the invention comprises a plurality of parallel and similar radiating elements located in the same plane and forming a rectangular aerial aperture, the respective longitudinal axis of two adjacent elements being distant from each other a fraction of the operating wavelength, the energy guiding means coupling said radiating elements to an energy source comprising respective directional energy absorbing devices for absorbing any energy flowing in said guiding means in the direction towards said energy source, phase adjusting means and amplitude adjusting means.

In one embodiment of the invention which is more particularly adapted for a frequency range between 1,000 and 100,000 mc./s. the elements are formed by the mouths of rectangular wave guides, at least the terminal portions of which are superimposed on each other. Ferrite isolators are placed in these guides.

In another embodiment, more particularly adapted to operate over a much lower frequency range, for example between 10 and 1,000 mc./s., the elements are radiating dipoles which are fed in parallel through respective electronic tubes.

The invention will be best understood from the following description and appended drawing, wherein.

Figure 7:
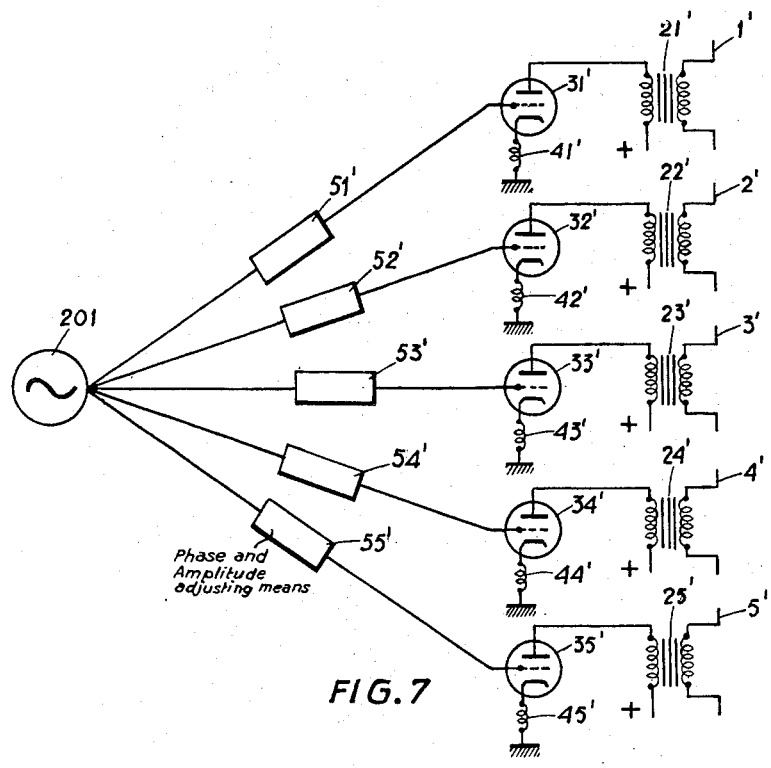
Figure 8:
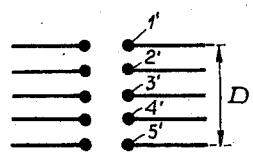

FIGS. 7 and 8 refer to a modification.

Figure 1:
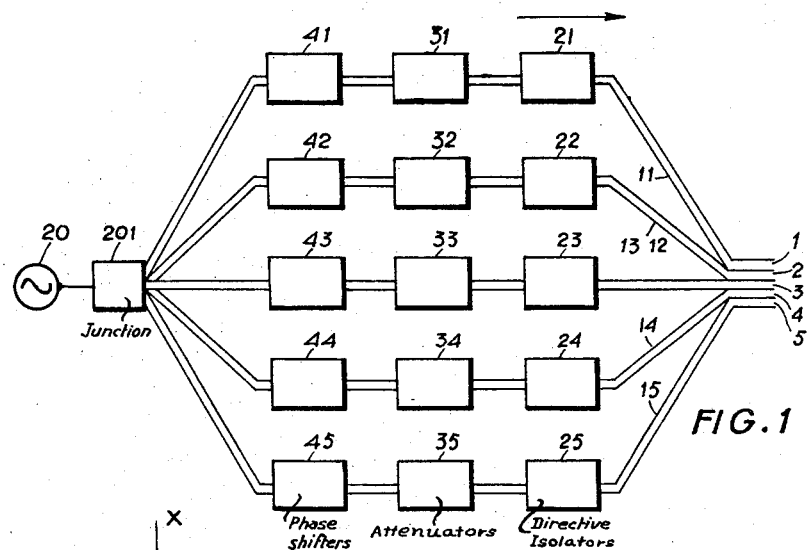
FIG. 1 is a block diagram of a radiating device according to the invention.
Figure 2:
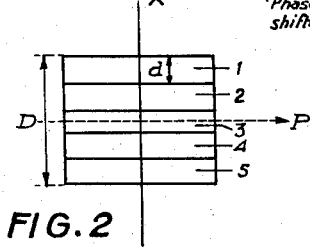
FIG. 2 represents diagrammatically a front view of the mouths of the five guides shown in FIG. 1.

The system shown in FIG. 1, comprises five wave guides 11, 12, 13, 14 and 15 which are fed in parallel from an ultra high frequency source 20 through a junction 201. The respective mouths 1 to 5 of the guides are shown in FIG. 2. Guides 11 to 15 comprise respective unidirectional ferrite insulators of a conventional type 21 to 25, respective attenuators 31 to 35 and respective phase-shifters 41 to 45.

The ferrite isolator absorbs in a conventional manner the energy propagating in a direction opposite to that of the arrow in FIG. 1.

The assembly of elements 1 to 5 shown in FIG. 2 forms one rectangular mouth, the dimensions of which are of the order of the operating wavelength.

The device operates as follows:

Energy from source 20 is simultaneously radiated by elements 1 to 5. The respective waves which are thus radiated are phase-shifted with respect to each other due to the action of phase shifters 41 to 45. Their respective amplitudes are adjusted by means of attenuators 31 to 53. It may be shown that, by suitably selecting these phases and amplitudes, the assembly possesses a great directivity in the plane of symmetry common to the elements 1 to 5, i.e. in the vertical plane if the sources are disposed as indicated in the figure.

D being the sum of the vertical dimensions of mouths 1 to 5, if the latter simultaneously radiate vertically polarized waves, the apertures of the diagram at 3 dbs is distinctly lower than that given by the Formula 1.

It can be shown that this improvement in directivity is due to the fact that the amplitude and phase distribution in the vertical dimension of the aperture is no longer uniform.

Figure 3:
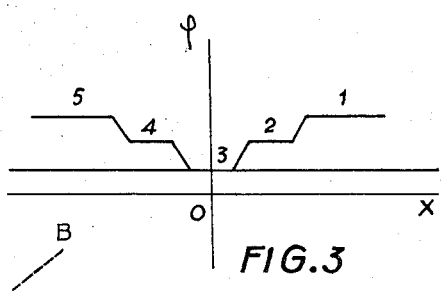
FIG. 3 is a graphic representation of the phase distribution between the radiating elements.

According to one embodiment of the invention, attentuators 31 to 35 are adjusted separately in such a manner that each of these elements, with all the others extinguished, radiates the same vertically polarized wave. As to phase shifters 41 to 45, they are adjusted as shown in FIG. 3, i.e. the phase of element 3 being taken as a reference, the respective phases of elements 2 and 4 are $\varphi_1$, and those of sources 1 and 5, $2\varphi_1$, $\varphi_1$ being of the order of 20°. By plotting on the abscissae the distances to the median plane of mouth 3 and on the ordinates the phases, a stair-shaped curve, as shown in FIG. 3, is obtained.

With $$D = 5d = \frac{3\lambda}{4}$$

the applicant has obtained a radiation pattern in the vertical plane, the aperture of which, at 3 db, is of the order of 18° to 22°. A horn having the same external dimensions would provide a radiation pattern having an aperture of 70°.

The following explanation would appear to account in a satisfactory manner for the above result, it being understoood that the applicant does not want to be limited by this explanation or by any other, the invention being primarily concerned with the structure and the operation thereof.

Figure 4:
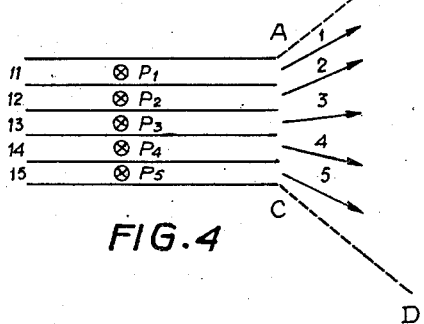
FIG. 4 shows in longitudinal section the guide assembly of FIG. 1.

Photons such as $P$, $P_2$, $P_3$, $P_4$ and $P_5$ respectively propagate in guides 11 to 15, shown in cross section in FIG. 4, in non-correlated phase relationship, elements 1, 2, 3, 4 and 5 being decoupled from each other by means of ferrite insulators 21 to 25. Then photons arrive at elements 1, 2, 3, 4 and 5. They tend to move apart from each other, whereafter the paths will tend to become parallel and everything happens as if the output aperture were ahead of the plane formed by elements 1, 2, 3, 4 and 5 and had a much larger area than that corresponding to the sum of the cross sectional areas of these elements.

This output pupil is that of an horn ABCD, which would be located at the mouth of the guide assembly.

Figure 5:
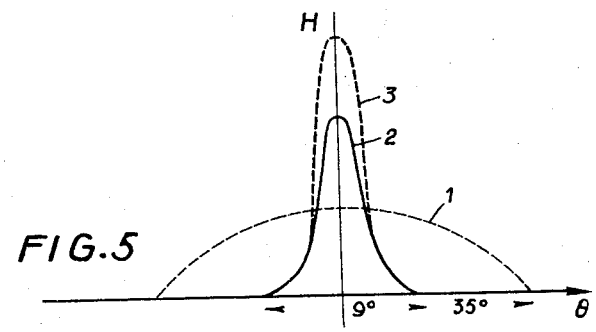
FIG. 5 is the radiating pattern of the aerial of FIG. 1 in the common plane of symmetry of the five elements.

FIG. 5 shows in dotted line at 1 the radiating pattern $H = f(\theta)$ of a horn of the same aperture as the aerial of FIG. 1; at 3, the pattern of the aerial of FIG. 1 would radiate if a portion of the energy were not absorbed by the decoupling ferrite devices; at 2, in full line the actual radiation pattern of this aerial.

It may be shown that the directivity depends on the number of radiating elements along the vertical direction of the aperture of the aerial of FIG. 1.

Thus, the vertical dimension common to all the elements must be as small as possible.

Figure 6:
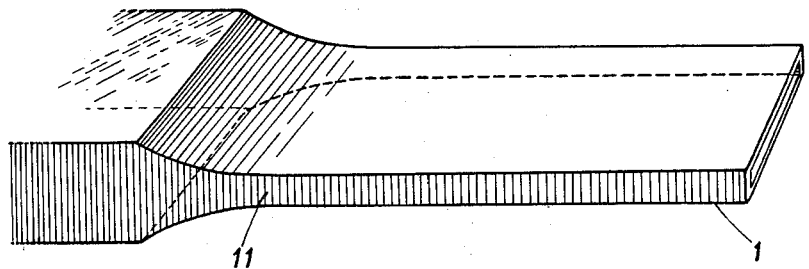
FIG. 6 is a perspective view of one of the guides shown in FIG. 1.

Therefore, guides tapered at their free end, as shown in FIG. 6, will be preferred.

FIG. 7 illustrates an aerial according to the invention for frequencies for which it is not possible to use ferrites.

This aerial comprises five radiating dipoles 1' to 5' which are fed by the secondary windings of transformers 21' to 25', the primary windings of which are in the respective anode circuits of tubes 31' to 35', the cathodes of which are grounded through load resistances 41' to 45' and the grids of which are fed in parallel, through respective phase and amplitude adjusting devices 51' to 55' from source 201.

FIG. 8 is a front view of dipoles 1' to 5' which are located in parallel relationship in the same vertical plane, so as to form a rectangle the vertical dimension D of which is of the order of ¾λ. These dipoles are decoupled from each other by tubes 31' to 35' which play the same part as the ferrites in the embodiment of FIG. 1.

Of course, the invention is not limited to the embodiments shown which are given merely by way of example.

What is claimed is:

1. A directional aerial for electromagnetic waves comprising in combination: a plurality of parallel and similar radiating elements having respective longitudinal axes, located in the same plane and forming a rectangular radiating aperture, the distance between the respective longitudinal axes of any two adjacent elements being a fraction of the operating wavelength; an electromagnetic energy generator; a plurality of transmission lines respectively connecting said generator to said element; and, in each transmission line, means for preventing any energy from flowing from said elements to said generator, phase adjusting means and amplitude adjusting means.

2. A directional aerial for electromagnetic waves comprising in combination: a plurality of parallel and similar radiating elements having respective longitudinal axes, located in the same plane and forming a rectangular radiating aperture, the distance between the respective longitudinal axes of any two adjacent elements being a fraction of the operating wavelength; an electromagnetic energy generator; a plurality of transmission lines respectively connecting said generator to said elements; in each transmission line, a directional absorbing device for absorbing any energy flowing from said elements to said generator, phase adjusting means and amplitude adjusting means; and means for matching respectively said elements to said transmission lines.

3. A directional aerial for electromagnetic waves comprising in combination: a plurality of parallel, similar radiating rectangular waveguides, having respective mouths located in the same plane, having respective longitudinal axes and forming a rectangular radiating aperture, the distance between the respective longitudinal axes of any two adjacent mouths being a fraction of the operating wavelength; an electromagnetic energy generator; said wave guides being respectively connected to said generator; and in each guide, a directional ferrite isolator for absorbing any energy flowing from said mouths to said generator, phase adjusting means, and amplitude adjusting means for respectively adjusting the phase and the amplitude of the energy radiated by each mouth.

4. A directional aerial for electromagnetic waves comprising in combination: a plurality of parallel, similar radiating rectangular waveguides having respective tapered end portions having respective mouths located in the same plane, said mouths having respective longitudinal axes and forming a rectangular radiating aperture, the distance between the respective longitudinal axes of any two adjacent mouths being a fraction of the operating wavelength; an electromagnetic energy generator; said wave guides being respectively connected to said generator; and in each guide, a directional ferrite isolator for absorbing any energy flowing from said mouths to said generator; phase adjusting means and amplitude adjusting means for respectively adjusting the phase and the amplitude of the energy radiated by each mouth.

5. A directional aerial for electromagnetic waves comprising in combination: a plurality of parallel and similar radiating dipoles, located in the same plane and forming a rectangular radiating aperture, the distance between any two adjacent dipoles being a fraction of the operating wavelength; an electromagnetic energy generator; a plurality of transmission lines respectively connecting said generator to said dipoles; and, in each transmission line, an electronic tube having a control grid and an anode, said control grid being connected to said transmission line and said anode to said dipole, and phase adjusting means and amplitude adjusting means for respectively adjusting the phase and amplitude of the energy radiated by each dipole.

6. A directional aerial for electromagnetic waves comprising in combination: a plurality of parallel and similar radiating dipoles, located in the same plane and forming a rectangular radiating aperture, the distance between any two adjacent dipoles being a fraction of the operating wavelength; an electromagnetic energy generator; a plurality of transmission lines respectively connecting said generator to said dipoles; in each transmission line an electronic tube having a control grid and an anode, said control grid being connected to said transmission line and said anode to said dipole, phase adjusting means and amplitude adjusting means for respectively adjusting the phase and amplitude of the energy radiated by each dipole and means for matching said dipoles to said tubes.

7. A directional aerial for electromagnetic waves comprising in combination: a plurality of parallel and similar radiating dipoles, located in the same plane and forming a rectangular radiating aperture, the distance between any two adjacent dipoles being a fraction of the operating wavelength; an electromagnetic energy generator; a plurality of transmission lines respectively connecting said generator to said dipoles; in each transmission line an electronic tube having a control grid and an anode, said control grid being connected to said transmission line and said anode to said dipole, phase adjusting means and amplitude adjusting means for respectively adjusting the phase and the amplitude of the energy radiated by each dipole and a transformer having a primary winding connected to said anode and a secondary winding connected to said dipole.

References Cited in the file of this patent

UNITED STATES PATENTS

| | | |
|---|---|---|
| 1,627,718 | Ware | May 10, 1927 |
| 2,030,181 | Potter | Feb. 11, 1936 |
| 2,286,839 | Schelkunoff | June 16, 1942 |
| 2,437,281 | Tawney | Mar. 9, 1948 |
| 2,776,412 | Sparling | Jan. 1, 1957 |
| 3,028,593 | Alford | Apr. 3, 1962 |

OTHER REFERENCES

Microwave Principles (Reich, Skalnik, Ordung, Krauss), published by D. Van Nostrand 1957 (page 102 relined on).